Nov. 12, 1929.     W. GAARZ ET AL     1,735,002
QUICK RESPONDING LEAKAGE RELAY
Filed Nov. 17, 1925
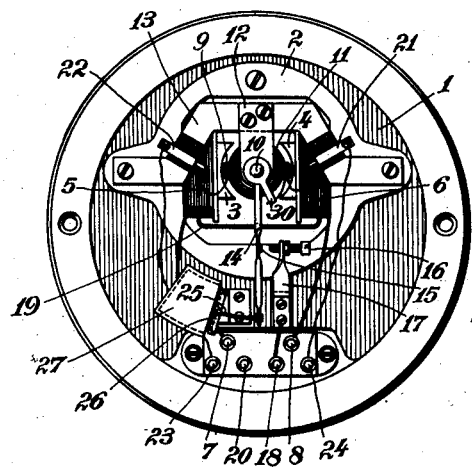
Inventors
Wilhelm Gaarz, and
Joachim Sorge
by Knight Bro.
Attorneys Patented Nov. 12, 1929

1,735,002

UNITED STATES PATENT OFFICE

WILHELM GAARZ AND JOACHIM SORGE, OF BERLIN-CHARLOTTENBURG, GERMANY, ASSIGNORS TO SIEMENS & HALSKE, AKTIENGESELLSCHAFT, OF SIEMENSSTADT, NEAR BERLIN, GERMANY, A CORPORATION OF GERMANY

QUICK-RESPONDING LEAKAGE RELAY

Application filed November 17, 1925, Serial No. 69,607, and in Germany February 16, 1925.

The present invention relates to improvements in relays of the wattmeter type serving for responding to short-lasting earth connections in alternating current lines.

In order to control or indicate earth connections or leakages, which casually occur in alternating current lines, leakage relays are employed which are constructed on the wattmeter principle so that they will act when receiving energy from a certain direction. Relays constructed on the wattmeter principle contain two sets of coils reacting upon each other, each set being traversed by a different current derived from the line system. For instance one set may be excited by the current and the other by the voltage of the line system. Relays heretofore used for this purpose have certain disadvantages. For instance that they only indicate the leakage after it has existed for some time and they are not set into action through leakages which constitute only single intermittent flashovers, or through an occasional short-lasting leakage.

The object of the present invention is to construct a leakage relay which also responds to leakages of the last mentioned kind. In accordance with the invention the mass and the damping of the movable system in the novel relay are made so small, that a deflection is obtained even if the leakage lasts only during a few periods of an alternating current of at least 15 periods per second or for a still shorter time. According to the invention means are also furnished, which prevent the instrument from operating and from making undesired indications merely on account of the light mobility of the parts of the relay.

A preferred constructional form of the invention is shown by way of an example in the accompanying drawing.

On a base plate 1 an iron ring 2 is fastened, which carries on its inner side the field cores 3 and 4. These cores are surrounded by coils 5 and 6 respectively. One end of each coil is connected to the terminals 7 and 8 respectively, and the other ends are connected together, so that the coils are electrically in series. Between the cores 3 and 4 a coil 9 is movably arranged. This coil is located on a shaft (not shown in the drawing) which is pivoted in a bearing 10. This bearing is carried by a lug 12 which is fastened to a cross piece 13, which again is fastened to the iron ring 2 by means of screws. A spiral spring 11 is connected with one end to the lever 30, which is adjustably pivoted on the support 12. The inner end of the spring 11 is connected to the coil 9 which by means of the spring is thus kept in the position shown in the drawing. To the coil 9 a contact arm 14 is rigidly connected which is equipped with a contact plate 15. When the coil rotates counter-clockwise the contact plate will abut against a counter contact, which is formed by the point of a set screw 16. This screw is carried by a support 17, which is connected to the terminal 18. The contact plate 15 is electrically connected to the parts 12 and 13 over the contact arm 14, the shaft of the coil 9 not shown in the drawing and the bearing 10 and from these parts a wire (not shown) passes to the contact terminal 20. The ends of the movable (rotatable) coil 9 are connected by means of flexible connections to the contact terminals 21 and 22 which are fastened on but insulated from the cross piece 13. From the terminals 21 and 22 wires are passing to the connecting terminals 23 and 24.

The described apparatus differentiates from the earlier known leakage relays in so far as the movable parts are of an extremely light construction, and when moving from the middle position towards the contact screw 16 they do so with so little damping that even a very short-lasting temporary leakage will be sufficient to effect a contact between the contacts 15 and 16. Such a temporary leakage, which often occurs, will create a current between the line and the ground, which current, as has been observed in a great number of cases will last for two periods of the alternating current. Occasionally the current will however last for a longer or for a considerably shorter time. The leakage relay according to the invention must on account of this similarity to a ballistic galvanometer act upon rushes of current which in the most favorable cases last for about 1/5 second, but which frequently last for even a much shorter time, for instance for 1/25 or 1/50 second.

If a stop resembling the contact screw 16 were arranged also on the other side of the contact arm 14 the latter might rebound from the screw 16 and abut against the contact on the other side from which it again would rebound and for the second time close the contact between the pieces 15 and 16. In order to prevent this we fix a disc 26 to the end of the contact arm 14 by means of a pin 25. As soon as the contact arm moves from its middle position to the left the disc 26 enters a damping cylinder 27 and thus the mechanism acts as a dash-pot known to those skilled in the art. If the contact arm 14 equipped with such a dash pot or equivalent means, rebounds from the screw 16 its velocity will be consumed by the damping device 26, 27. It will therefore slowly return into its middle position, so that it is unable to make a second contact. This damping device is also advantageous when the contact arm 14 at first is deflected to the left. Also in this case the damping device will prevent an undesired contact with the screw 16.

The relay may for instance be employed in the manner that an indicating device is operated by the circuit which is to be closed by the contacts 15 and 16. The said circuit may however also be used for operating a switching device, by means of which the faulty line section is switched off. Auxiliary means of this character are omitted from the drawings and description since they are not involved in the present invention and constitute matter well within the knowledge of those skilled in the art.

While we have shown and described one embodiment of the invention, we wish it to be understood that we do not desire to be limited to the details thereof, as various modifications may occur to a person skilled in the art.

Having thus fully described our invention, what we claim as new and desire to secure by Letters Patent is:—

1. In a transmission line for alternating current having a periodicity of at least 15 per second, an alternating current relay built on the wattmeter principle and being suitably connected into said line to operate when the line is grounded, and serving for the control of leakages of short duration, said relay consisting of a stationary alternating current coil system traversed by one kind of line current, a movable coil system traversed by another kind of line current and comprising a coil and a contact arm, means for maintaining the movable system in a middle position and a fixed contact adapted to close an electric circuit together with the said contact arm when the movable system moves from said middle position, said movable system having an extremely small mass and low damping, to permit rushes of current lasting at most three periods of the alternating current to effect a contact between the said contact arm and the said fixed contact.

2. In a transmission line for alternating current having a periodicity of at least 15 per second, an alternating current relay built on the wattmeter principle and being suitably connected into said line to operate when the line is grounded, and serving for the control of leakages of short duration, said relay consisting of a stationary alternating current coil system traversed by one kind of line current, a movable coil system traversed by another kind of line current and comprising a coil and a contact arm, a spring for maintaining the movable system in a middle position and a fixed contact adapted to close an electric circuit together with said contact arm when the movable system moves from said middle position, said movable system having an extremely small mass and low damping to permit rushes of current lasting at most three periods of the alternating current to effect a contact between the said contact arm and the said fixed contact.

3. In a transmission line for alternating current having a periodicity of at least 15 per second, an alternating current relay built on the wattmeter principle and being suitably connected into said line to operate when the line is grounded, and serving for the control of leakages of short duration, said relay consisting of a stationary alternating current coil system traversed by one kind of line current, a movable coil system traversed by another kind of line current and comprising a coil and a contact arm, means for maintaining the movable system in a middle position and a fixed contact adapted to close an electric circuit together with the said contact arm, when the movable system moves from said middle position said movable system having an extremely small mass and low damping to permit a current rush of a single flash-over due to an intermittent leakage to effect a contact between the said contact arm and the said fixed contact.

4. In a transmission line for alternating current having a periodicity of at least 15 per second, a wattmeter type relay consisting of a stationary alternating current coil system traversed by one kind of line current, a movable coil system disposed within said stationary system and being traversed by another kind of line current and comprising a coil and a contact arm thereon, means for maintaining the movable system in a neutral position, a fixed contact disposed in the path of said contact arm, a damping device comprising two coacting elements of which one is connected to the movable system and the other is stationarily arranged, so that it co-operates with the first named element when the contact arm moves from its neutral position in a direction away from the fixed contact, said movable system having an extremely small mass and low damping to permit rushes of current lasting at most three periods of the alternating current to effect a contact between the said contact arm and the said fixed contact.

5. In a transmission line for alternating current having a periodicity of at least 15 per second, a wattmeter type relay consisting of a stationary alternating current coil system traversed by one kind of line current, a movable coil system traversed by another kind of line current and comprising a coil and a contact arm thereon, means for maintaining the movable system in a neutral position, a fixed contact disposed in the path of said contact arm and a damping device comprising a plunger fastened to the movable system and a damping cylinder disposed in the plunger path so that the plunger passes into the cylinder when the contact arm passes its neutral position while moving away from the fixed contact, said movable system having an extremely small mass and low damping to permit rushes of current lasting at most three periods of the alternating current to effect a contact between the said contact arm and the said fixed contact.

In testimony whereof we affix our signatures.

WILHELM GAARZ.
JOACHIM SORGE.